July 29, 1947.  M. A. EDWARDS  2,424,809

SELSYN CONTROLLED ELECTRIC MOTOR SYSTEM

Filed Oct. 17, 1940

Inventor:
Martin A. Edwards,
by Harry E. Dunham
His Attorney.

Patented July 29, 1947

2,424,809

UNITED STATES PATENT OFFICE 2,424,809

SELSYN CONTROLLED ELECTRIC MOTOR SYSTEM

Martin A. Edwards, Scotia, N. Y., assignor to General Electric Company, a corporation of New York Application October 17, 1940, Serial No. 361,599

6 Claims. (Cl. 172—239)

This invention relates to control systems, more particularly to follow-up control systems for driving an object into positional agreement with a pilot device, and it has for an object the provision of a simple, reliable and improved system of this character.

More specifically, the invention relates to follow-up systems in which fine and coarse controlling means are employed for controlling the driving means which drives the driven object, and a specific object of the invention is the provision of improved means for transferring the control from the fine controlling means to the coarse controlling means when the positional disagreement of the pilot device and driven object exceeds a predetermined amount, and for re-transferring the control to the fine controlling means when the positional disagreement becomes less than this predetermined amount.

In carrying the invention into effect in one form thereof, means are provided for driving the driven object, and coarse and fine control means responsive to positional disagreement of the pilot device and driven object together with connections between the coarse and fine control means and the driving means are provided for controlling the driving means to drive the driven object toward correspondence with the pilot device. The coarse control means are normally ineffective when the positional disagreement between the pilot device and driven object is less than a predetermined amount, and electric valve means included in the connections between the coarse control means and the driving means serve to render the coarse control means effective and thereby to transfer the control from the fine control means to the coarse control means when the positional disagreement exceeds the predetermined amount mentioned in the foregoing, and to render the coarse control means ineffective when the disagreement becomes less than the predetermined amount.

In illustrating the invention in one form thereof, it is shown as applied to a follow-up control system in which the driven object is driven by an electric motor, but it will be understood that it may be applied to follow-up systems in which the driven object is driven by any other suitable form of driving means.

Figure 1:
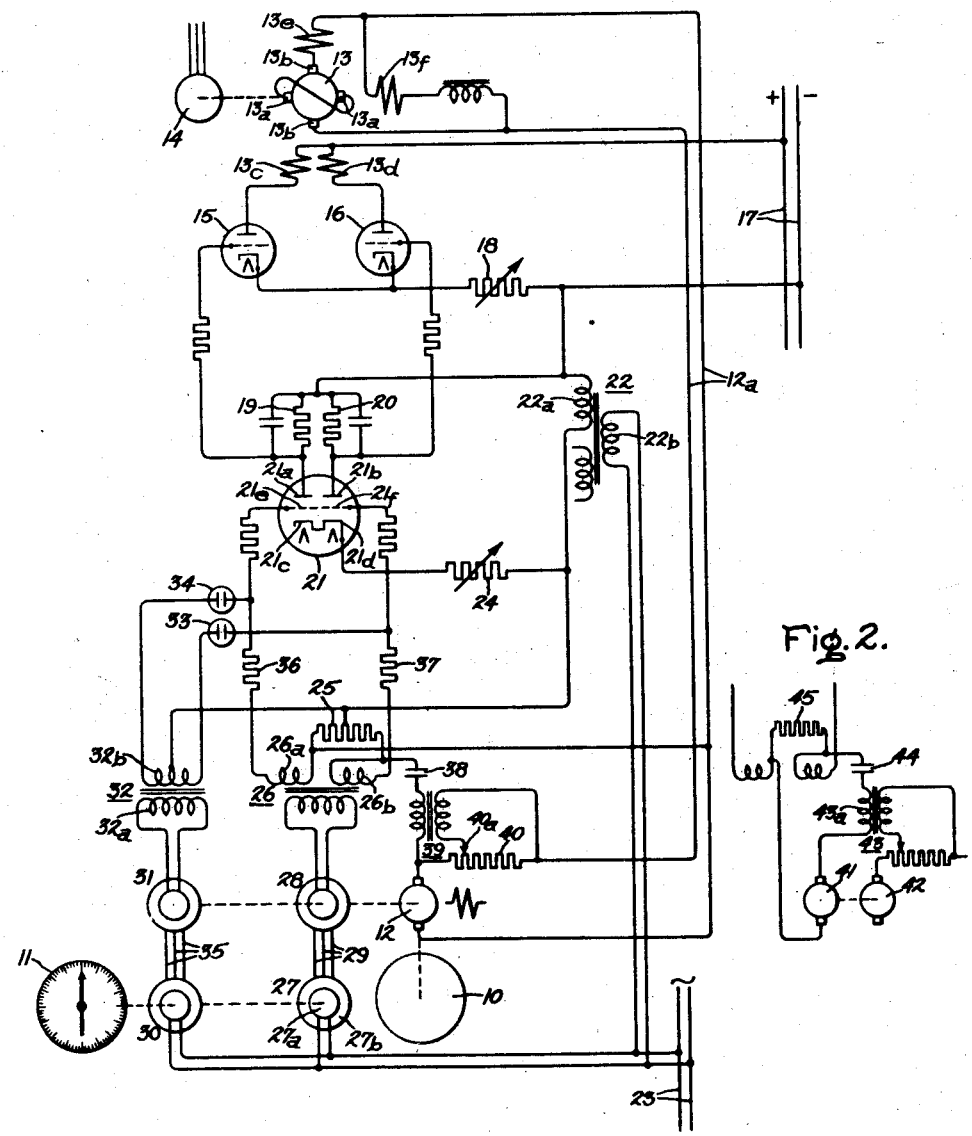
Figure 2:
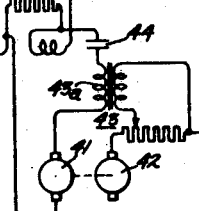

For a better and more complete understanding of the invention, reference should now be had to the following specification and to the accompanying drawing in which Fig. 1 is a simple, diagrammatical representation of an embodiment of the invention, and Fig. 2 is a simple, diagrammatical representation of a modification.

Referring now to the drawing, an object 10 is to be driven in positional agreement with a pilot or control device 11 by suitable driving means such, for example, as represented by the direct current motor 12 to the drive shaft of which the object 10 is connected by means of suitable reduction gearing (not shown). Direct current is supplied to the armature of the motor 12 by means of a special generator 13 having a pair of short circuited armature brushes 13a and a pair of load brushes 13b to which the armature of the motor 12 is connected by means of conductors 12a. The generator 13 is an armature reaction excited dynamoelectric machine and is driven at a speed which is preferably substantially constant by any suitable driving means, such as an induction motor 14 to the drive shaft of which the shaft of the armature reaction machine 13 is connected by suitable coupling means (not shown). The axis of the flux which is produced by the short circuited armature brushes 13a is referred to as the short circuit axis, and the axis which is displaced 90 electrical degrees from the short circuit axis is referred to as the control axis. If it be assumed that the axis of the brushes 13a coincides with the short circuit flux axis, then the load brushes 13b are on the control axis. The net flux along the control axis is produced by two opposing control field windings 13c and 13d, a series compensating field winding 13e and the armature reaction of the load current itself. The flux along the short circuit axis of the dynamoelectric machine 13 is produced by the shunt field winding 13f and the armature reaction of the short circuit current. This short circuit axis flux generates the voltage which appears across the load brushes 13b, and the control axis flux produces the voltage which appears across the short circuited brushes 13a and causes short circuit current to flow.

The operation of the machine 13 will be readily understood by considering the operation with only one control field winding, for example, the field winding 13c, and also without the shunt field winding 13f and the series compensating winding 13e, and then subsequently considering the effect of these field windings on the operation.

Let it be assumed that voltage is applied to the field winding 13c and current begins to build up in this field winding. Immediately there is generated a voltage in the short circuit path which circulates a large current in the short circuit.

Since the resistance of the short circuit is so low as to be almost negligible, the control field winding 13c is only required to produce a very small flux in order to produce a large current in the short circuit and a correspondingly large armature flux. Furthermore, since the flux of the control field winding need only build up to such a low value, and since the reactance of the short circuited armature is very low, full load current in the short circuit will be obtained in an exceptionally short time. The armature reaction flux produced by the short circuit current generates a voltage across the load brushes 13b and causes load current to flow. This load current will produce an armature flux which opposes the flux of the control field winding 13c. This would, of course, mean that the flux of the control field winding 13c would have to be large enough to overpower this control axis armature flux. However, by using the series compensating field winding 13e through which the load current passes, the armature reaction on the control axis can be substantially completely neutralized. Thus, by the use of this series compensating field, the control field is only required to produce enough field flux and voltage to overpower the resistance drop in the short circuit; and the time constant or rate of response of the machine is consequently very fast.

The function of the shunt field winding 13f is to reduce the steady state short circuit current. For any given voltage across the load brushes 13b, there must be a corresponding flux on the short circuit axis. If any part of this flux is produced by a shunt field winding, the amount of flux which must be produced by the short circuit armature current will be correspondingly reduced. For example, if the shunt field is adjusted to give enough excitation to generate nine-tenths of the voltage across the load brushes 13b, the short circuit current for any given load voltage need be only one-tenth as great as it would have to be if there were no shunt field winding.

The control field windings 13c and 13d on the control axis of the armature reaction generator 13 are connected in the cathode-anode circuits of electric valves 15 and 16, respectively. The cathode-anode circuits of these valves 15 and 16 are connected across a suitable source of direct current voltage 17 with the anodes of the valves 15 and 16 connected through the control field windings 13c and 13d, respectively, to the positive side of the source 17, and the cathodes of these valves connected through the self-biasing resistor 18 to the negative side of the source 17. The cathode grid circuit of the valve 15 extends from the cathode of the valve through the self-biasing resistor 18 and the resistor 19 to the grid of the valve and as a result, the grid is given a negative bias. Similarly, the cathode grid circuit of valve 16 extends from the cathode through biasing resistor 18 and resistor 20 to the grid of valve 16, and accordingly, the grid of this valve is similarly given a negative bias.

A twin triode electric valve 21 having a pair of conducting paths is provided for controlling the grid voltage of the valves 15 and 16. The anode-cathode circuit of the valve 21 is connected across the secondary winding 22a of a transformer 22 whose primary winding 22b is connected across a suitable source of single-phase alternating voltage represented by the two supply lines 23. As shown, the anodes 21a and 21b of this valve are connected through resistors 19 and 20, respectively, to one terminal of the secondary winding 22a, and the cathodes 21c and 21d are connected through a biasing resistor 24 to the opposite terminal of the secondary winding 22a. Since the valve 21 has two anodes, it has two conducting paths and the current in each of these paths is separately controllable by controlling the voltages applied to the two grid control elements 21e and 21f. The grid 21e controls the flow of current in the path between the cathode 21c and the anode 21a, and the grid 21f controls the conductivity of the path between the cathode 21d and the anode 21b. The cathode grid circuit for the left-hand conducting path of the valve 21 extends from the cathode through the biasing resistor 24, the left-hand portion of a resistor 25, and a secondary winding 26a of a transformer 26 to the grid 21e, and similarly, the cathode grid circuit for the right-hand conducting path of the valve 21 extends from the cathode through biasing resistor 24 and the right-hand path of resistor 25 and secondary winding 26b of transformer 26 to the grid 21f. The voltages of the grids 21e and 21f with respect to the cathodes 21c and 21d, respectively, as a result of the inclusion of the biasing resistor 24 in the anode-cathode circuits of valve 21 are such that both paths of the valve 21 normally conduct equal amounts of current, for example, 4 milliamperes. This condition of equal conduction in both paths of the valve 21 occurs when the follow-up system is in correspondence, i. e., when the driven object 10 is in positional agreement with the pilot device 11. When equal amounts of current are flowing through both paths of the valve 21, the voltage drops across resistors 19 and 20 are equal and these voltage drops combined with the voltage drop across resistor 18 produce a bias of the voltages of the grids of valves 15 and 16 with respect to their cathodes such that these valves conduct equal amounts of current, e. g., 40 milliamperes. The current conducted by the valves 15 and 16 excite the control field windings 13c and 13d of the armature reaction generator 13. However, since the control field windings 13c and 13d act in opposition to each other, the net exciting flux along the control axis of the generator 13 is zero and therefore the voltage at the load brushes 13b is zero. It will thus be clear from the foregoing that when the follow-up system is in correspondence, equal amounts of current flow in both paths of the valve 21 and likewise equal amounts of current flow in the valves 15 and 16, with the result that the terminal output voltage of the generator 13 is zero.

In order to vary the bias voltages of the grids 21e and 21f of the valve 21, a component voltage of variable magnitude is supplied to the grid circuit substantially in phase with the anode voltage through the transformer 26, whose secondary windings 26a and 26b are connected in the cathode grid circuits of the valve 21 as explained in the foregoing, and whose primary winding is connected to the single-phase alternating current source 23 through rotary induction apparatus illustrated as comprising a rotary induction device 27 referred to as the transmitter and a similar rotary induction device 28 referred to as the receiver regulator. The rotary induction device 27 comprises a rotor member 27a provided with a single-phase winding (not shown) and a stator member 27b provided with a distributed three-element winding (not shown) that is physically similar to the polyphase winding of an ordinary wound rotor induction motor. The stator and rotor windings are arranged in inductive relationship with each other so that the alternating magnetic field due to the current flowing in the primary winding induces voltages in the elements of the secondary winding. The receiver regulator 28 is in all respects identical with the transmitter 27, and the terminals of its stator winding are connected to the terminals of the stator winding of the transmitter by means of conductors 29 so that the voltages induced in the stator winding of the transmitter cause currents to flow in the stator winding of the receiver regulator, thereby producing a magnetic field similar to the magnetic field produced by the current flowing in the rotor winding of the transmitter. Rotation of the rotor member of the transmitter causes a voltage to be induced in the rotor winding of the receiver owing to the shift in the position of the axis of the magnetic field of the receiver regulator relative to the axis of the coil of the rotor member, and the magnitude of this induced voltage depends upon the relationship of the axis of this winding to the axis of the magnetic field, e. g., when the axes of the magnetic field and of the rotor winding are parallel, the induced voltage is maximum, whereas when these axes are at right angles with each other, the induced voltage is zero. It will therefore be clear that rotation of the rotor of the transmitter or of the receiver regulator will vary the magnitude of the component voltage supplied to the grid circuit of the electric valve apparatus which, in turn, will result in a variation in the relationship of the currents flowing in the conducting paths of the valve 21. The grid connections to the electric valve 21 are so made, as explained in the foregoing, that when the voltage applied to one of the grids of the valve 21 is increased, the voltage applied to the other grid of the valve 21 is simultaneously decreased and consequently, when the current through one of the conducting paths of the valve 21 is increased, the current through the other conducting path is simultaneously decreased.

The rotor of the transmitter 27 is mechanically connected through suitable gearing (not shown) to the movable element of the pilot device 11. For the purpose of increasing the accuracy and sensitivity of the control, the ratio of this gearing between the pilot device and the rotor of the transmitter can be made as large as is desired, for example, the ratio may be as great as 72:1, i. e., for each degree that the pilot device is rotated, the rotor of the transmitter is rotated 72°. The rotor of the receiver regulator 28 is connected either to the shaft of the motor 12 or to the shaft of the driven object 10 by means of suitable gearing (not shown) having the same ratio as the gearing between the pilot device and the transmitter.

This large gear ratio provides a very fine and very accurate control. If the ratio is 72:1 as assumed, then for each 5° of rotation of the pilot device the rotor of the transmitter 27 is rotated a full 360°. However, since the axes of the rotor winding of the receiver regulator 28 and the magnetic field of the stator are parallel at two points in one complete revolution of the transmitter, i. e., at 0° revolution and at 180° revolution of the transmitter, it will be clear that the pilot device and the driven object must not be allowed to become more than 2½° out of correspondence with each other while under the control of the high speed fine control system because when this amount of positional disagreement occurs, the same relationship exists between the rotors of the transmitter and receiver regulator as exists when the pilot device and driven object are in correspondence with each other. In practice, under actual operating conditions, the rotor of the transmitter often does become more than this amount out of correspondence with the driven object 10 and a coarser system is therefore provided for taking over the control from the high speed fine control system before this amount of positional disagreement is exceeded. This coarse system is illustrated as comprising a transmitter 30 that is identical with the transmitter 27 and a receiver regulator 31 that is similar to the receiver regulator 28. The single-phase rotor winding of the transmitter 30 is connected to the alternating voltage source 23, and the single-phase rotor winding of the receiver regulator 31 is connected to the terminals of the primary winding 32a of a transformer 32, the terminals of the secondary winding 32b of which are connected to the grids 21e and 21f of the valve 21 through electric valves 33 and 34. The midpoint of this secondary winding 32b is connected to the midpoint of the resistor 25. The stator windings of the transmitter 30 and receiver regulator 31 are connected to each other by means of conductors 35.

The rotor of the transmitter is directly connected to the rotatable member of the pilot device 11 by means of suitable gearing having a 1:1 ratio, and the rotor member of the receiver regulator 31 is connected through suitable gearing (not shown) having a 1:1 ratio to the driven object 10. Thus it will be seen that the transmitter 30 and the receiver regulator 31 constitute a low speed system and provide the desired coarse control.

The electric valves 33 and 34 may be of any suitable type but are preferably of the two-electrode type into the envelopes of which a small quantity of an inert gas, such for example as neon, is introduced after exhaust. A characteristic of a valve of this character is that when a voltage of less than a predetermined value is applied to its terminals, the valve does not conduct current and that when this voltage is exceeded, the neon gas becomes ionized and the valve becomes conducting.

The transformer 32 is so designed that when the positional disagreement of the pilot device and driven object is less than a predetermined amount, e. g. 2½° or less, the voltage applied to valves 33 and 34 is less than the ionization or breakdown voltage of these valves but equals or exceeds the ionization voltage when the positional disagreement equals or exceeds this predetermined amount. Thus, when the positional disagreement is less than this predetermined amount, the control connections between the coarse control system and the grids of valve 21 are interrupted and the coarse control system is ineffective, and when the disagreement equals or exceeds this amount, the valves become conducting and the voltage induced in the secondary winding of the transformer 32 is applied to the grids of the valve 21 and is thereafter effective in controlling the valve 21. Resistors 36 and 37 having relatively high ohmic resistances are included in the connections between the terminals of the secondary windings 26a, 26b and the grids 21c and 21f of valve 21. These resistors 36 and 37 assist the valves 33 and 34 in transferring the control from the fine control system to the coarse control system when the positional disagreement equals or exceeds the predetermined amount mentioned in the foregoing description.

For the purpose of preventing hunting in the operation of the system, a capacitor 38 is connected in series with the resistor 25 across the terminals of the driving motor 12. The charge on this capacitor 38 varies as the voltage of the armature varies. When the voltage of the motor armature is constant, the charge on the capacitor is constant and when the voltage of the motor is varying at a high rate, the charge on the capacitor 38 is likewise varying at a high rate. When the charge on the capacitor 38 is varying, a current is caused to flow in the resistor 25 which is proportional to the rate at which the charge on the capacitor is varying. In other words, the current caused to flow in the resistor 25 is proportional to the rate of change of the charge on the capacitor which, in turn, varies in accordance with the rate of change of voltage of the motor armature 12 and since the voltage of the motor 12 is approximately proportional to its speed, the current caused to flow in the resistor 25 is also approximately proportional to the rate of change of the speed of the motor 12. Thus the capacitor introduces a correcting force or voltage into the grid circuit of the valve 21 which is proportional to the rate of change of speed of the motor 12. The polarity of the connections of the capacitor 38 in the grid circuit of the electric valve 21 is such that the current caused to flow in the resistor 25 as a result of a change in the charge on the capacitor 38 is in such a direction as to control the armature reaction generator 13 through valves 21, 15, and 16 transiently to reduce the amount of current that is supplied to the motor 12 so that the amount of current actually supplied to the motor 12 for any given positional disagreement of the pilot device and driven object is less than would otherwise be supplied to the motor 12. In addition to the capacitor 38 a transformer 39 is provided for introducing another corrective force or component into the control to prevent hunting or overshooting. The secondary winding of this transformer 39 is connected in series relationship with the capacitor 38, and the primary winding of this transformer is connected across a resistor 40 which is connected in series relationship in the connections between the generator 13 and the motor 12 so that the voltage drop across resistor 40 is proportional to the current in the armature circuit of the motor. The resistor 40 is provided with a movable contact member 40a for properly proportioning the corrective component introduced through transformer 39 with respect to that produced by the capacitor 38. A voltage is induced in the secondary winding of transformer 39 only when the armature current of the motor 12 is changing and the magnitude of this induced voltage is proportional to the rate at which the armature current is changing. Consequently, the corrective component introduced by transformer 39 is proportional to the rate of change of armature current of motor 12, and since in a motor having constant excitation, such as the motor 12, torque is proportional to current, the corrective component introduced by transformer 39 is proportional to the rate of change of torque of motor 12.

With the foregoing understanding of the elements and their organization in the completed system, the operation of the system itself will readily be understood from the following detailed description:

Assuming the pilot device 11 and the driven object 10 to be in positional agreement, the system is in its normal deenergized condition in which it is illustrated. As previously pointed out, when in this condition, both paths of the valve 21 are conducting equal amounts of current and likewise, valves 15 and 16 are conducting equal amounts of current so that the opposing control field windings 13c and 13d of the armature reaction generator are equally excited and the output voltage of the generator 13 is zero. Manual rotation of the pilot device 11 effects a corresponding but multiplied rotation of the rotor of transmitter 27, causing a rotation of the magnetic field of the stator of receiver regulator 28 so that a voltage is induced in the rotor winding of the receiver regulator proportional to the amount of rotation of the pilot device 11. This induced voltage is applied to the grid circuit of the electric valve 21 and results in increasing the current flowing in one conducting path of the valve and decreasing the current flowing in the other path. Assuming that the direction of rotation of the pilot device is such as to increase the current flowing from the cathode to the anode 21a and to decrease the current flowing from the cathode to the anode 21b, the negative bias of the grid of valve 15 is increased and the negative bias of the grid of valve 16 is decreased, owing to the increase and decrease in the voltage drops across the resistors 19 and 20, respectively. As a result, the conductivity of valve 16 is increased and the conductivity of valve 15 is decreased, and this results in increasing the excitation of the control field winding 13d and decreasing the excitation of the control field winding 13c of the armature reaction generator 13. The difference in excitations of the two opposing field windings 13c and 13d produces a net excitation along the control axis of the generator 13, and as a result, the generator 13 generates an output voltage which supplies current to the armature of the motor 12 in such a direction that the motor is caused to rotate in a direction to drive the object 10 toward correspondence with the pilot device 11.

If the driven object 10 cannot follow the rapid movement of the pilot device 11 with the result that the positional disagreement of the driven object and pilot device equals or exceeds the predetermined amount, the voltage induced in the secondary winding of the transformer 32 becomes so great that the voltages applied to the electrode terminals of the electric valves 33 and 34 exceed the ionization voltages of these valves causing them to become conducting. Voltages continue to be induced in the secondary windings 26a and 26b of the transformer 26 after the electric valves 33 and 34 have become conducting, but on account of the high resistance of the resistors 36 and 37 the voltages induced in the secondary windings 26a, 26b are no longer effective and the electric valve 21 is controlled solely by the voltage induced in the secondary winding 32b of transformer 32. Thus when the electric valves 33 and 34 become conducting, the control connections between the low speed coarse control system and the electric valve 21 are completed and the control of the follow-up system is effectively transferred from the high speed fine control system to the low speed coarse control system. The completion of the connections between the receiver regulator 31 and the grid circuit of the electric valve 21 causes such a high voltage to be applied to the grid circuit of the valve 21 that the current supplied by armature reaction generator 13 to the armature of motor 12 causes motor 12 to drive the driven object at maximum speed in the same direction as that in which the pilot device is moving.

Had the departure from correspondence been in the opposite direction, the operation of each of the elements would be similar but opposite to that of the operation thus far described with the result that current of opposite polarity would have been supplied to the armature of the motor 12 and the motor 12 would have driven the driven object in the reverse direction.

Assuming now that the pilot device is brought to rest, the driven object 10 will be approaching correspondence with the pilot device at maximum speed and when it arrives within the predetermined maximum permissible amount of positional disagreement with the pilot device, the voltages applied to the electrode terminals of valves 33 and 34 will become less than the ionization voltage of these valves and the valves will accordingly become nonconducting. The result of the valves 33 and 34 becoming nonconducting is to interrupt the control connections between the low speed coarse control system and the grid circuit of the valve 21, thereby to render the low speed coarse control system ineffective and to transfer the control to the high speed fine control system. Finally, as the driven object approaches exact and accurate correspondence with the pilot device 11, the axis of the rotor winding of the receiver regulator 28 approaches a right angle relationship with the axis of the magnetic field of the stator winding and as a result the voltage induced in the rotor winding of the receiver regulator becomes zero and the electric valve 21 is restored to the condition of equal conduction in both of its conducting paths. This results in disappearance of the net excitation along the control axis of the armature reaction generator 13 so that its output voltage is reduced to zero and the motor 12 is brought to rest with the driven object 10 in correspondence with the pilot device 11.

As previously suggested, the operation of the system as described in the foregoing is modified slightly, especially during acceleration and deceleration, for the purpose of minimizing "overshooting" and "hunting."

During acceleration, the rising voltage of the motor terminals will begin to build up a charge on the capacitor 38 and the charging current of the capacitor will flow through the resistor 25 in the grid circuit of the electric valve 21 with the result that the bias voltages of the grids 21a and 21b are altered so that the current supplied to the motor 12 is reduced below the value that would otherwise be supplied to the motor for the then existing positional disagreement of the pilot device and driven object.

During deceleration of the motor, i. e., when the driven object is approaching correspondence with the pilot device, the capacitor 38 discharges and the flow of discharge current through resistor 25 produces a voltage across the resistor which alters the bias voltages of the grids of valve 21 so as to lower the voltage of the generator 13 a greater amount than it would otherwise be lowered if controlled solely by the decreasing voltage induced in the secondary winding of receiver regulator 28 as the system approaches correspondence. The lowering of the voltage of generator 13 may reach such an extent that the generator voltage will be exceeded by the countervoltage of motor 12, thereby resulting in operation of motor 12 as a generator to pump current back to generator 13 and thereby to produce a strong and effective braking torque of motor 12, such as to bring the motor and driven object 10 to rest without overshooting the position of correspondence.

If the deceleration of motor 12 from maximum speed is proceeding at an extremely rapid rate, the discharge current of the capacitor 38 will be correspondingly high, and the effect of this high discharge current through the resistor 25 on the bias voltages of the grids of valve 21 may be so pronounced as actually to decrease the voltage of generator 13 to zero and to reverse it. This results in "plugging" the motor 12 and causing it to exert an extremely strong and effective braking torque to decelerate the driven object to rest in correspondence with the pilot device without significant overshooting or hunting.

At very low speeds of motor 12 the terminal voltage and rates of change thereof are usually low in comparison with the motor current and rates of change thereof. Consequently, at these very low speeds, transformer 39 supplies the principal component of the antihunt correction and this component operates in a manner similar to that produced by the capacitor 38 to produce the antihunt operation described in the foregoing.

In certain follow-up applications the loads imposed on the follow-up motor are so heavy and the rates of acceleration and deceleration encountered are so high that the terminal voltage of the motor is not an accurate measure of its speed. In order to provide accurate control for these applications and to obtain an antihunting effect that is accurately proportional to the rate of change of speed of the motor, a tachometer generator 41 mechanically driven from the shaft of the follow-up motor 42 is provided, as illustrated in the modification of Fig. 2. In this modification, the follow-up motor 42 corresponds to the follow-up motor 12 of Fig. 1. The series circuit comprising the secondary winding 43a of transformer 43, capacitor 44, and resistor 45 is connected across the terminals of the tachometer generator 41 instead of being connected across the terminals of the follow-up motor 42 as the corresponding series circuit is connected in the system of Fig. 1. Otherwise, the modification of Fig. 2 is identical with the system of Fig. 1 and the operation is also identical, with the exception that the accuracy is improved because the voltage supplied by the tachometer generator 41 is an accurate measure of the speed of the follow-up motor 42.

Although in accordance with the provisions of the patent statutes, this invention is described as embodied in concrete form and the principle thereof has been described together with the best mode in which it is now contemplated applying that principle, it will be understood that the elements and connections shown and described are merely illustrative and that the invention is not limited thereto, since alterations and modifications will readily suggest themselves to persons

What I claim as new and desire to secure by Letters Patent of the United States is:

1. A follow-up control system for a pilot device and driven object comprising in combination, driving means for said object, means for controlling said driving means comprising an electric valve provided with a control grid, coarse and fine control means responsive to positional disagreement of said pilot device and driven object for producing control voltages dependent on the positional disagreement of said pilot device and driven object, electrical connections from each of said control means to said grid, electric valve means having main discharge supporting anodes and cathodes included serially in the connections between said coarse control means and said grid, and responsive to a predetermined value of said control voltage of said coarse control means for conducting current from said coarse control means through the circuit of the connections of said fine control means thereby to render said fine control means ineffective and said coarse control means effective and responsive to values of said control voltage of said coarse control means less than said predetermined value for interrupting the supply of current from said coarse control means to the circuit of said fine control means thereby to transfer control from one of said control means to the other in accordance with the magnitude of said positional disagreement.

2. A follow-up control system comprising in combination, a pilot device, a driven object, electric valve means having a pair of conducting paths and control grids for controlling the conductivity of each of said paths, driving means for said object controlled by said valve means, fine and coarse control means for producing control voltages having predetermined relationships to positional disagreement of said pilot device and driven object, electrical connections including a transformer between said fine control means and said grids, electrical connections including a transformer between said coarse control means and said grids and electric valve means containing an ionizable medium and having their main discharge supporting anodes and cathodes serially included in the connections between said coarse control means and said grids and responsive to a predetermined voltage produced by said coarse control means for conducting current from said coarse control means through the circuit of the connections between said fine control means and said grid thereby to transfer control of said driving means from said fine control means to said coarse control means.

3. A follow-up control system comprising in combination, a pilot device, a driven object, electric valve means having a pair of conducting paths and control grids for controlling the conductivity of each of said paths, driving means for said object controlled by said valve means, fine and coarse control means for supplying voltages to said control grids having predetermined relationships to positional disagreement of said pilot device and driven object for controlling said driving means to drive said object toward correspondence with said pilot device, electrical connections between said coarse control means and said grids and electric valve means containing an ionizable medium and main discharge supporting anodes and cathodes connected serially in said connections and responsive to a predetermined voltage produced by said coarse control means for conducting current from said coarse control means to the grid circuit of said first mentioned electric valve means thereby to transfer control of said driving means from said fine control means to said coarse control means.

4. A follow-up control system comprising in combination, a pilot device, a driven object, electric valve means having a pair of conducting paths and control grids for controlling the conductivity of each of said paths, driving means for said object controlled by said valve means, fine and coarse control means for producing control voltages dependent upon the positional disagreement of said pilot device and driven object, a first control transformer having its primary winding connected to said fine control means and its secondary winding connected to said grids for supplying the voltage from said fine control means to said grids, a resistor included in circuit between each of said grids and a corresponding terminal of said secondary winding, a second control transformer having its primary winding connected to said coarse control means and having connections from its secondary winding to the connection points of said resistors and said grids, an electric valve having its main discharge supporting cathode and anode serially included in each of said connections between the secondary winding of said second transformer and said grids and responsive to a predetermined voltage produced by said coarse control means for conducting current from the secondary winding of said second transformer through the secondary circuit of said first transformer thereby to transfer control of said driving means between said fine and coarse control means in accordance with the positional disagreement of said pilot device and driven object.

5. A follow-up control system for causing a driven object to follow the movement of a pilot device comprising an electric motor for driving said object, an armature reaction generator provided with a pair of opposed control field windings for supplying said motor, electric valve means provided with a pair of current conducting paths for controlling the excitation of said field windings, said valve means being provided with control grids for separately controlling the conductivity of said paths, means responsive to positional disagreement of said pilot device and driven object for supplying voltages to the grid circuit of said valve means to control said motor to drive said object toward correspondence with said pilot device and antihunting means comprising a capacitor connected in said grid circuit and a tachometer generator driven by said motor for supplying a voltage to said capacitor proportional to the speed of said motor so that the grid voltage of said valve means is modified in accordance with the rate of change of speed of said motor.

6. A follow-up control system for causing a driven object to follow the movement of a pilot device comprising a direct current electric motor for driving said object, an armature reaction generator provided with a pair of opposed control field windings for supplying said motor, electric valve means provided with a pair of current conducting paths for controlling the excitation of said field windings, said valve means being provided with control grids for separately controlling the conductivity of said paths, means responsive to positional disagreement of said pilot device and driven object for supplying voltages to the grid circuit of said valve means to control said motor to drive said object toward correspondence with said pilot device, and antihunting means comprising a capacitor connected in said grid circuit and a tachometer generator driven by said motor for supplying a voltage to said capacitor proportional to the speed of said motor thereby to modify the grid voltage of said valve means in accordance with the rate of change of speed of said motor and a transformer having its secondary winding connected in series with said capacitor and having its primary winding connected to be energized by the armature current of said motor so that said grid voltage is further modified in accordance with the rate of change of torque of said motor.

MARTIN A. EDWARDS.

REFERENCES CITED

The following references are of record in the file of this patent:

UNITED STATES PATENTS

| Number | Name | Date |
|---|---|---|
| 2,113,436 | Williams | Apr. 5, 1938 |
| Re. 16,667 | Hewlett | July 5, 1927 |
| 1,985,982 | Edwards | Jan. 1, 1935 |

FOREIGN PATENTS

| Number | Country | Date |
|---|---|---|
| 489,271 | Great Britain | July 22, 1938 |